US 11,538,604 B2

(12) United States Patent
Ponard et al.

(10) Patent No.: US 11,538,604 B2
(45) Date of Patent: Dec. 27, 2022

(54) ALUMINA-CERAMIC-BASED ELECTRICAL INSULATOR, METHOD FOR PRODUCING THE INSULATOR, AND VACUUM TUBE COMPRISING THE INSULATOR

(71) Applicant: THALES, Courbevoie (FR)

(72) Inventors: Pascal Ponard, Neuvecelle (FR); Christophe Bourat, Sciez (FR)

(73) Assignee: THALES, Courbevoie (FR)

( * ) Notice: Subject to any disclaimer, the term of this patent is extended or adjusted under 35 U.S.C. 154(b) by 909 days.

(21) Appl. No.: 16/346,508

(22) PCT Filed: Nov. 2, 2017

(86) PCT No.: PCT/EP2017/078091
§ 371 (c)(1),
(2) Date: Apr. 30, 2019

(87) PCT Pub. No.: WO2018/083194
PCT Pub. Date: May 11, 2018

(65) Prior Publication Data
US 2019/0295738 A1   Sep. 26, 2019

(30) Foreign Application Priority Data

Nov. 2, 2016   (FR) ...................................... 1601563

(51) Int. Cl.
*H01B 3/12*        (2006.01)
*H01B 19/04*       (2006.01)
(Continued)

(52) U.S. Cl.
CPC ............... *H01B 3/12* (2013.01); *C04B 35/10* (2013.01); *C04B 35/117* (2013.01);
(Continued)

(58) Field of Classification Search
CPC .. H01B 3/12; H01B 3/10; H01B 19/04; C04B 35/10; C04B 41/5041; C04B 2111/00405;
(Continued)

(56) References Cited

U.S. PATENT DOCUMENTS 3,729,575 A * 4/1973 Harding ................. H01J 19/44
                                                                313/313
2006/0138715 A1   6/2006 Lim et al.
(Continued)

FOREIGN PATENT DOCUMENTS

CN        201655738 U      11/2010
CN        102 086 118 A     6/2011
(Continued)

OTHER PUBLICATIONS

English translation of Chinese First Office Action issued in Chinese Patent Application No. 201780081924.0.
(Continued)

*Primary Examiner* — Karl E Group
*Assistant Examiner* — Cameron K Miller
(74) *Attorney, Agent, or Firm* — BakerHostetler

(57) ABSTRACT

An alumina-ceramic-based electrical insulator, to a method for producing the insulator, and to a vacuum tube includes the insulator. The electrical insulator is for insulating two electrodes of a vacuum tube through which a charged particle beam flows, the electrical insulator being formed of an alumina-based ceramic. The ceramic comprises a vitreous phase of between 2% and 8% by weight into which at least one metal oxide is diffused from a face of the electrical insulator.

14 Claims, 3 Drawing Sheets

(51) Int. Cl.
   *H01B 3/10*     (2006.01)
   *H01J 35/16*    (2006.01)
   *C04B 41/50*    (2006.01)
   *C04B 35/10*    (2006.01)
   *C04B 35/117*   (2006.01)
   *C04B 41/00*    (2006.01)
   *C04B 41/87*    (2006.01)
   *C04B 111/92*   (2006.01)
   *C04B 111/00*   (2006.01)

(52) U.S. Cl.
   CPC ........ *C04B 41/009* (2013.01); *C04B 41/5041* (2013.01); *C04B 41/87* (2013.01); *H01B 3/10* (2013.01); *H01B 19/04* (2013.01); *H01J 35/16* (2013.01); *C04B 2111/00405* (2013.01); *C04B 2111/92* (2013.01); *C04B 2235/3201* (2013.01); *C04B 2235/3206* (2013.01); *C04B 2235/3208* (2013.01); *C04B 2235/3232* (2013.01); *C04B 2235/3239* (2013.01); *C04B 2235/3241* (2013.01); *C04B 2235/3244* (2013.01); *C04B 2235/3418* (2013.01); *C04B 2235/75* (2013.01); *C04B 2235/79* (2013.01); *C04B 2235/80* (2013.01); *C04B 2235/85* (2013.01)

(58) Field of Classification Search
   CPC ... C04B 2111/92; C04B 2235/75; H01J 35/16
   See application file for complete search history.

(56) References Cited

U.S. PATENT DOCUMENTS

| 2013/0284948 | A1 | 10/2013 | Iwamoto |
| 2014/0362974 | A1 | 12/2014 | Yanagisawa et al. |
| 2015/0139401 | A1 | 5/2015 | Ribbing et al. |

FOREIGN PATENT DOCUMENTS

| CN | 104428272 A | 3/2015 |
| CN | 105405730 A | 3/2016 |
| CN | 105869975 A | 8/2016 |
| CN | 106057615 A | 10/2016 |
| EP | 1 537 594 A1 | 6/2005 |
| JP | 56-37274 A | 4/1981 |
| JP | 58-44662 A | 3/1983 |
| JP | 2-128412 A | 5/1990 |
| JP | 2012-99435 A | 5/2012 |
| JP | 2015-15227 A | 1/2015 |
| WO | 2004/023513 A1 | 3/2004 |
| WO | 2012/091062 A1 | 7/2012 |

OTHER PUBLICATIONS

English Translation of Notice of Grounds for Rejection issued in Korean Patent Application No. 10-2019-7015487 dated Dec. 1, 2020.

* cited by examiner

ALUMINA-CERAMIC-BASED ELECTRICAL INSULATOR, METHOD FOR PRODUCING THE INSULATOR, AND VACUUM TUBE COMPRISING THE INSULATOR

CROSS-REFERENCE TO RELATED APPLICATIONS

This application is a National Stage of International patent application PCT/EP2017/078091, filed on Nov. 2, 2017, which claims priority to foreign French patent application No. FR 1601563, filed on Nov. 2, 2016, the disclosures of which are incorporated by reference in their entirety.

FIELD OF THE INVENTION

The invention relates to an alumina-ceramic-based electrical insulator, to a method for producing the insulator, and to a vacuum tube comprising the insulator.

BACKGROUND

Vacuum tubes are used in numerous applications employing an electron beam or, more generally, a charged particle beam moving through vacuum. Vacuum tubes may be used in the field of amplifying radiofrequency signals or in the generation of X-rays.

Vacuum tubes comprise a plurality of electrodes between which the electron beams propagate. These electrodes are separated by electrical insulators, for example made of alumina-based ceramic.

A first problem encountered, in particular in X-ray generator tubes or in tube amplifiers, relates to the buildup of mirror electric charges, i.e. of charge opposite that of the particle beam, on the surface of the alumina or embedded below the surface down to a certain depth depending on the energy of the charges. This buildup may result in sudden relaxation via discharge inside the tube, or even in breakage via dielectric breakdown of the material. Consequently, it is necessary for these charges to flow locally away through the alumina without it negatively affecting the macroscopic insulating character of the material.

A second problem encountered in X-ray generator tubes or radiofrequency tube amplifiers is that the insulators used, generally made of alumina, may be subjected to extremely high electric fields. The insulator therefore requires a high-strength dielectric. Alumina can meet this need. However, care should be taken that the chosen charge-flow solution does not create one or more interfaces between layers of different permittivities, which could significantly decrease the dielectric strength of the insulator. This overlap between the solutions for the first and second problems has unfortunately not been properly addressed in the prior art.

In what follows, X-ray generator tubes will be used to illustrate the advantage of the invention, but the invention could be applied likewise to the alumina insulators used to hold the electrodes that are subjected to various high voltages in depressed collectors for traveling-wave tubes. For conventional X-ray generator tubes consisting of a glass envelope, the solution consists in distancing the surface of the dielectric as far from the electron beam as possible, hence the highly characteristic shape of these tubes. A resistive deposit based on chromium oxide $Cr_2O_3$ is also employed on the internal wall of the glass envelope in order to promote charge flow.

More recent X-ray generator tubes allow higher energy X-rays to be generated. Instead of the glass envelope, they consist of conductive metal materials, in association with alumina ceramic high-voltage insulators. By joining the metal materials and the insulators by soldering, it is possible to produce the envelope through which the electron beam propagates in vacuum between the anode and the cathode.

What are referred to as unipolar tubes possess a single ceramic dielectric insulator between the anode and the cathode and allow X-ray generator tubes to be produced for which the upper voltage is between 20 and 250 kV. For higher voltages ranging from 250 to 600 kV, what is referred to as a bipolar configuration is generally used. In this configuration, two insulators are employed and each one handles half of the total upper voltage. To limit the effects of mirror charges or charges implanted in the alumina, a number of solutions have been employed.

Tubes have been designed in which the alumina insulators and the electron beam are positioned as far apart as possible. This type of design negatively affects the compactness of the tube.

Protective equipotential conductive shielding placed between the alumina insulators and the electron beam has also been tried. Such shielding increases tube size and decreases breakdown resistance.

Particular geometries of ceramic have been developed, such as for example those described in document EP1537594 B1. The particular geometry of the ceramic allows charge implantation problems to be limited via an electrostatic equilibrium effect in which the field generated by the charges that have built up on the surface cancels out the electron emission effect. This equilibrium mechanism requires a ceramic that is a perfect insulator and entirely uncontaminated by any slightly conductive deposit under vacuum. In operation, it is observed that, after a few arcs have taken place, contaminant deposits appear on the surface of the ceramic insulators, limiting the effectiveness of this electrostatic equilibrium. Moreover, the particular geometry of the ceramics does not address the problem of longer distance Coulomb interaction with the electron beam, resulting in mirror charges.

Lastly, document U.S. Pat. No. 3,729,575 describes the use of a conductive deposit on the surface of an alumina ceramic insulator. This deposit allows charges to flow away. Conventional ceramics have an alumina content for which the purity is of the order of 99.5% and the process described in this document results in a surface layer having electrical properties that remain difficult to control, implementing a conduction mechanism that is mainly located in the layer and that may produce a large difference in permittivity at the interface between the surface layer and the alumina.

Document U.S. Pat. No. 3,729,575 describes a fused resistive film present on the surface of the alumina. This film is thick enough, of the order of 50 μm (or 0.002 inches), to address both charges on the surface and high-energy electrons embedded in the alumina. This deposit has a resistivity from $3.10^8$ to $1.10^{13}$ ohms per square.

This proposed solution, based on depositing fused metal oxides on the surface of the alumina, is not satisfactory since the process for producing a fused layer on the surface will result in an interface between two layers having different relative permittivities: 9.6 for alumina and a value that is three to four times higher for the fused layer of partially reduced metal oxides. It is recalled that the relative permittivity of a perfect dielectric is 1 (vacuum, air, etc.) This permittivity increases toward infinity with the conductive character of the material.

The equations for the transition between two dielectric media, derived from Gauss's law for the electric field E, demonstrate a singularity at the interface of the normal component of the field to the surface. At the interface between layers of different permittivities, local amplification of the electric field occurs. This can result in the dielectric breakdown of the material due to the local amplification of the electric field E.

This scenario is particularly disadvantageous in the case of X-ray generator tubes in which the electric field gradients in the alumina insulator are already locally particularly high, of the order of 20 MV/m for a typical dielectric strength of sintered alumina of 25 MV/m.

SUMMARY OF THE INVENTION

The invention aims to overcome all or some of the problems mentioned above by providing an insulator and a tube produced using this insulator requiring neither any particular geometry nor any particular electrostatic shielding. The invention allows the charges that are liable to be deposited on the surface of the insulators to be drained away. The invention makes it possible to avoid any break in permittivity between the surface of the insulator that has been treated to drain away charges and the depth of the insulator itself.

Unlike the prior art, the invention does not employ a ceramic in which the purity of the alumina has to be high, of the order of 99.5%, and exhibiting the highest levels of dielectric strength. Rather, the invention proposes making use of a ceramic possessing vitreous-phase impurities allowing the diffusion of a charge drainage layer deposited on the surface.

More specifically, one subject of the invention is an electrical insulator for insulating at least one electrode of a vacuum tube through which a charged particle beam flows, the insulator being formed of an alumina-based ceramic, characterized in that the ceramic is formed of a polycrystalline material, between the boundaries of which a vitreous phase of between 2% and 8% by weight is present, into which at least one metal oxide is diffused from a face of the insulator, the metal oxide concentration decreasing gradually with distance from the face.

In the prior art, to produce an insulator for a vacuum tube, such as those for generating X-rays in which the electric fields are large, a very pure ceramic, without a vitreous phase, having an alumina content of 90% to 99.6%, is employed instead, since these exhibit the highest levels of dielectric strength. This low vitreous-phase content of the alumina does not favor the diffusion of metal oxides deposited on the surface, a fused phase diffusing only 50 to 100 µm down into the alumina appears on the surface, as described in document U.S. Pat. No. 3,729,575. Conversely, in the invention, alumina in which the intergranular vitreous-phase content is much higher is used so as to promote the deep diffusion of metal oxides deposited on the surface.

The diffusion, under controlled atmosphere conditions, of one or more metal oxides below the face of the insulator therewithin makes it possible to obtain a gradient of electrical properties according to depth with respect to the face, in particular a variation in electrical permittivity according to a monotonic function of the depth.

This monotonic function makes it possible to avoid locally decreasing the dielectric strength of the alumina, contrary to the observations made for embodiments according to the teaching of document U.S. Pat. No. 3,729,575.

More specifically, the material exhibits a continuous variation in electrical resistance and a continuous variation in dielectric permittivity from the face down to a depth of the insulator to which the at least one metal oxide has not diffused into the intergranular vitreous phase.

Advantageously, the vitreous phase is between 5% and 7%, and ideally 6%, by weight.

Advantageously, the vitreous phase comprises one or more alkaline-earth compounds mixed with fillers comprising at least one element from the group formed by silica and zirconia.

The at least one metal oxide may comprise a chromium oxide and a titanium oxide.

The electrical insulator may be tubular in shape and the face from which the at least one metal oxide is diffused is an internal face of the tubular shape. Other shapes of insulator are also possible, such as for example a conical or cylindrical shape.

Another subject of the invention is a process for producing an electrical insulator according to the invention. The process comprises a first step of depositing at least one metal oxide in solution in a solvent on the face of the insulator followed by a second step of heat treating the insulator, allowing the at least one metal oxide to diffuse into the vitreous phase of the ceramic.

Advantageously, in the second step, periods under a reducing atmosphere are employed in series with periods under a more oxidizing atmosphere so as to promote a partial reduction of the metal oxides.

Advantageously, before the second, heat treatment step, the alumina is substoichiometric with respect to oxygen.

Another subject of the invention is a vacuum tube comprising an electrical insulator according to the invention, and at least one electrode insulated by the electrical insulator.

Advantageously, in a vacuum tube in which the electrical insulator is produced according to the process described above, the electrical insulator is partly covered by a first metallization making electrical contact with the at least one electrode, and the deposit partly covers the first metallization.

Advantageously, the electrical insulator is partly covered by a second metallization arranged over the first metallization, including over the portion of the first metallization that is covered by the deposit.

The tube is for example an X-ray generator tube or a radiofrequency amplifier tube.

BRIEF DESCRIPTION OF THE DRAWINGS

The invention will be better understood and further advantages will become apparent upon reading the detailed description of one embodiment provided by way of example, which description is illustrated by the attached drawing, in which.

For the sake of clarity, the same elements will bear the same references in the various figures.

DETAILED DESCRIPTION

Figure 1:
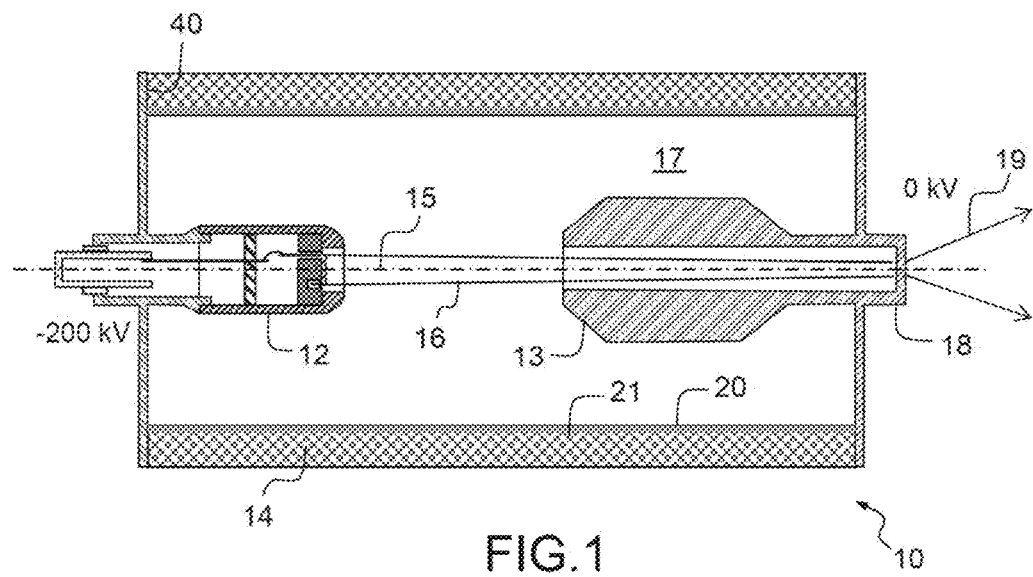
FIG. 1 shows an example of an X-ray generator vacuum tube according to the invention.

FIG. 1 schematically shows an x-ray generator vacuum tube 10. It is clearly apparent that the invention is not limited to an X-ray generator tube. The invention may be employed in any other type of vacuum tube, for example those for amplifying radiofrequency signals, such as for example a traveling-wave tube or a klystron.

The vacuum tube 10 comprises an anode 12 and a cathode 13 separated by a tube-shaped insulator 14 lying along an axis 15. An electron beam 16 propagates along the axis 15 between the anode 12 and the cathode 13 inside a cavity 17 formed within the tubular shape of the insulator 14. The cavity 17 is closed off by the anode 12 at one end and by the cathode 13 at the other end. The cathode 13 comprises a target 18 transforming the energy of the electrons from the electron beam 16 into X-ray radiation 19. A difference in potential of 200 kV is applied between the anode 12 and the cathode 13.

FIG. 1 shows a unipolar tube configuration, the maximum difference in potential of which is smaller than 300 kV. Further configurations are envisageable in which the invention may also be employed. For example, in a bipolar configuration, the difference in potential may reach 450 kV, or even 600 kV, the external envelope being made of metal and ceramic insulators being arranged between this cylindrical external envelope and the anode and cathode each being kept at a polarity that is equal in terms of absolute value. The invention may be employed for each of the insulators. Each insulator insulates its associated electrode from the metal envelope.

The insulator 14 is formed from an alumina-based ceramic. From its internal face 20, a metal oxide is diffused into the alumina. In FIG. 1, a zone 21 of the ceramic is shown from the internal face 20. The metal oxide is diffused into the zone 21. In practice, there is no precise boundary between the zone 21 and the rest of the insulator 14. The metal oxide is diffused gradually into the zone 21. The metal oxide concentration decreases gradually with distance from the face 20 and with depth into the ceramic 21. This unbroken gradient in the oxide concentration is important for avoiding a break in permittivity between the face 20, which is treated so as to remove any potential charges that may be deposited there, and the interior of the ceramic. The strength of the ceramic also increases in an unbroken gradient from its face 20.

To obtain an unbroken gradient in the metal oxide concentration, a particular ceramic is required. This alumina-based ceramic comprises a vitreous phase of between 2% and 8% by weight. It is into this vitreous phase that the metal oxide is diffused.

The alumina-based ceramic is a substantially polycrystalline material and a vitreous phase, i.e. a non-crystalline or amorphous phase, may be formed in the boundaries between the crystal grains. In the crystalline phase, the atoms or molecules are arranged regularly, unlike in the vitreous phase in which the atoms or molecules are distributed in a disordered fashion. The ceramic is for example produced by sintering grains of alumina. During the firing process for the sintering operation, the vitreous phase is liquefied, or at least becomes viscous, and is distributed between the boundaries of the alumina grains.

The vitreous phase comprises for example one or more alkaline-earth compounds mixed with fillers. Alkaline-earth compounds include in particular magnesium oxide (MgO), calcium oxide (CaO), sodium oxide ($Na_2O$) and potassium oxide ($K_2O$). Fillers include in particular silica $SiO_2$ and zirconia $ZrO_2$. This composition plays a role in the formation of the liquid phase during the sintering process and determines both the sintering densification temperature for aluminas and the vitreous-phase diffusion effects in sintered aluminas.

By choosing a particular alumina grade comprising a percentage by weight of vitreous phase of between 2% and 8%, the diffusion of the metal oxides takes place correctly. For a vitreous phase percentage of less than 2%, the electrical properties and the intergranular diffusion depths of the oxides deposited on the surface are insufficient and difficult to reproduce. For a vitreous phase percentage of more than 8%, sintering temperatures become increasingly low and the properties of alumina ceramics are negatively affected, in particular their dielectric strength, which is not desirable in insulators for X-ray generator tubes. Optimal diffusion is obtained for an alumina grade in which the vitreous phase is between 5% and 7%, and ideally 6%, by weight.

Various metal oxides may be retained for the purpose of being diffused into the vitreous phase of the alumina. It is possible to employ a single oxide. It is also possible to combine a plurality of oxides, such as for example a chromium oxide $Cr_2O_3$ and a titanium oxide $TiO_2$. Other oxides are possible, such as for example a vanadium oxide (VO, $V_2O_3$, etc.), a zirconium oxide ($ZrO_2$, etc.), etc.

Since the electrochemical potential of chromium and of titanium is higher than that of aluminum, the corresponding oxides will tend to be partially reduced once diffused into the alumina matrix if it contains some unoxidized aluminum atoms, i.e. if the alumina is substoichiometric with respect to oxygen. The presence of titanium and of chromium in metallic form allows the electrical properties of the insulator to be modified. The gradual diffusion makes it possible to obtain a concentration gradient of these metallic elements that is as widely spread as possible so as to avoid the effects of local amplification of the electric field in the alumina matrix thus modified.

Figure 2:
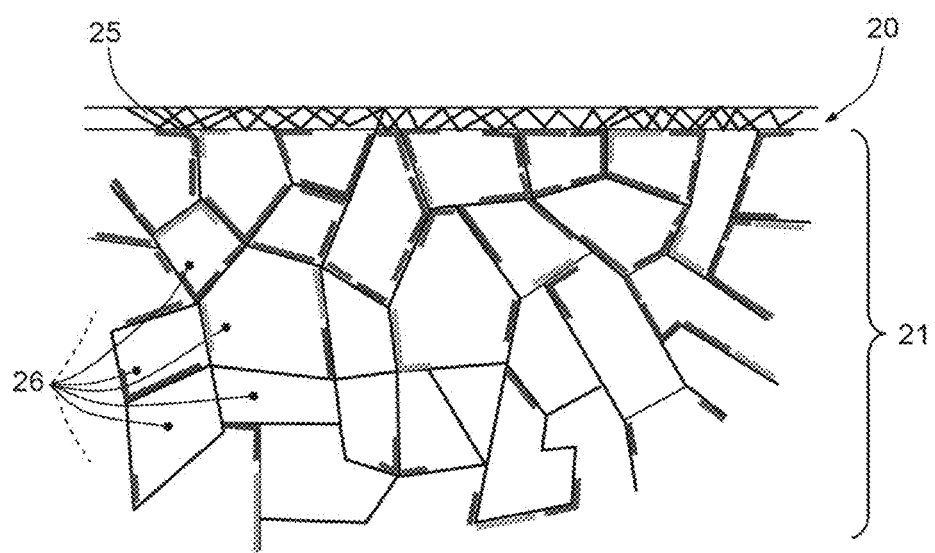
FIG. 2 shows, in partial section, an insulator employed in a vacuum tube according to the invention.

FIG. 2 shows, in partial section, the zone 21 of the insulator 14. At the face 20, a residual film 25 is made up of metal oxides enriched with the vitreous phase. When the insulator is heat-treated for the purpose of diffusing the metal oxides into the zone 21, the vitreous phase of the alumina tends to diffuse in the opposite direction, i.e. toward the face 20, which is why the residual film 25 is enriched with the vitreous phase. In the zone 21, crystalline alumina grains 26 are shown. The vitreous phase of the alumina surrounds the grains 26. The diffusion of the metal oxides and, potentially, of metals obtained after reduction of the oxides is shown as grayed zones surrounding each of the grains 26. In immediate proximity to the face 20, the diffusion is almost total around each grain 26. The further from the face 20, the more the degree of diffusion decreases.

To achieve this diffusion, two steps are carried out: a first step of depositing at least one metal oxide in solution in a solvent on the face 20 followed by a second step of heat treating the insulator 14, allowing the one or more metal oxides to diffuse into the vitreous phase of the ceramic. The deposition operation is for example performed by sputtering. To facilitate this deposition operation, it is possible to use an organic solvent. The heat treatment is for example an operation of firing the insulator at a temperature of between 1450° C. and 1520° C.

Figure 3A:
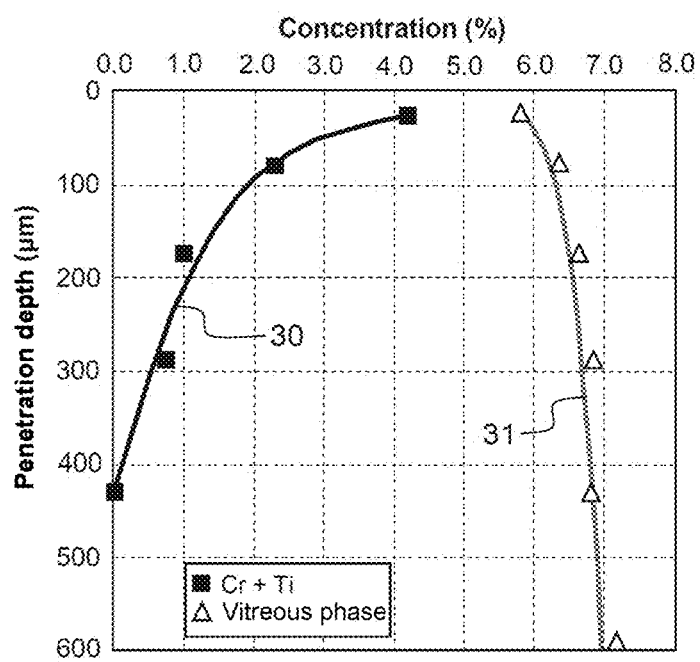
FIG. 3a shows two curves of the vitreous-phase concentration and concentration of metal oxides and/or of reduced metal with depth from a face of the insulator.

FIG. 3a shows two curves of the concentrations with depth from the face 20. The depths are expressed in μm and the concentrations are expressed as percentages by weight. A first curve 30 shows the concentration of metal oxides and/or of reduced metal, here of chromium and of titanium. In the immediate vicinity of the face 20, the chromium and titanium concentration is of the order of 4%. At a depth of around 450 µm, the chromium and titanium concentration becomes zero. Between these two extremes, the curve 30 does not experience any break and decreases regularly with increasing depth.

A second curve 31 shows the vitreous-phase concentration. At a depth of 600 µm, the vitreous-phase concentration is of the order of 7%. This concentration decreases until reaching slightly less than 6% in the immediate vicinity of the face 20. This decrease in vitreous-phase concentration is due to the heat treatment used for the diffusion operation. As the chromium and titanium diffuse down into the insulator, a slight diffusion of the vitreous phase in the opposite direction, toward the face 20, takes place.

Figure 3B:
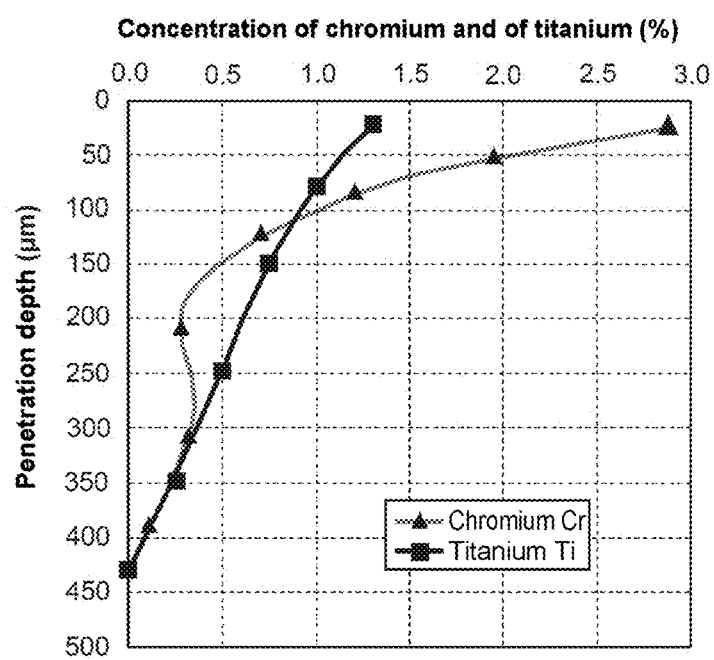
FIG. 3b shows the concentration distribution of two different oxides and/or reduced metals.

FIG. 3b shows the concentration distribution of two different oxides and/or reduced metals, still with depth from the face 20. It is observed that the two metals, chromium and titanium, diffuse differently with depth.

The obtained concentration gradient allows the gradient in electrical properties to be obtained. In other words, the insulator exhibits a continuous variation in electrical resistance from the face 20 down to a depth of the insulator to which the at least one metal oxide has not diffused. The average resistance for the thickness of the zone of alumina modified by the combined diffusion of chromium and of titanium is between $1.10^{11}$ ohms per square and $1.10^{13}$ ohms per square.

Similarly, the insulator exhibits a continuous variation in dielectric permittivity from the face 20 down to a depth of the insulator to which the at least one metal oxide has not diffused. The permittivity varies from 9.6 for alumina and gradually increases to between 25 and 30 up to the face 20 along the resistance gradient through the thickness over which the concentration varies.

The metal oxides are diffused down to a depth of the order of 500 µm from the face 20. The metal oxides are not diffused beyond this. Over the depth down through which the metal oxides have diffused, the electrical properties (resistance and dielectric permittivity) vary continuously and without jumps with depth. Beyond 500 µm, the intrinsic electrical properties of alumina return. Over the transition from the zone of the ceramic into which the metal oxides have diffused to the zone of the ceramic into which the metal oxides have not diffused, a continuous variation in electrical properties is observed.

The curves 3a and 3b result from tests carried out with a given duration of heat treatment for a given initial concentration of metal oxide. Other tests have shown that controlling the depth of diffusion depends primarily on temperature and on the duration of the heat treatment used for the diffusion operation.

Furthermore, it has been observed that when using a vacuum tube, the penetration of electrons into the alumina is dependent on the energy of the electrons in the beam. For example, for an X-ray generator vacuum tube operating with a potential difference of 200 kV, electrons penetrate down to approximately 200 µm, while for a potential difference of 450 kV, electrons penetrate down to approximately 500 µm. The depth of diffusion is adjusted depending on the use of the vacuum tube so that the electrons penetrating into the insulator below the face 20 are drained away optimally.

The amount of the elements chromium and titanium diffused into the thickness subsequent to heat treatment is fundamental to the flow of charges into the alumina. The value of the average resistance of the modified alumina layer is dependent on the amount of metal oxides deposited on the surface. The average resistance is also dependent on a partial reduction of the metal oxides. This reduction may already be achieved, at least in part, by virtue of the alumina, which may be slightly substoichiometric, i.e. slightly oxygen-deficient. The alumina then tends to take oxygen atoms belonging to the metal oxides and thus to reduce them.

As an alternative or in addition to the use of oxygen-substoichiometric alumina, in the heat treatment, it is possible to employ periods under a reducing atmosphere, for example through diffusion of dry hydrogen, in series with periods under a more oxidizing atmosphere, for example through diffusion of wet hydrogen. This series also allows the partial reduction of the insulating metal oxides to conductive metal elements in the alumina matrix to be controlled.

The electrical conduction of the insulator is partly due to the presence of the metallic elements chromium and titanium dispersed throughout the vitreous phase and between the grain boundaries and partly of ionic origin.

Regarding the conduction of metallic nature, titanium may assume a number of oxidation states. Like other transition metals, it possesses various degrees of oxidation, such as for example titanium monoxide (TiO), dititanium trioxide ($Ti_2O_3$), titanium dioxide ($TiO_2$), etc., which may be easily reduced. By choosing oxygen-substoichiometric alumina, for example of the type $Al_2O_{(3-x)}$, metallic titanium can be produced via partial reduction of $TiO_2$ to a lower oxide and saturation of alumina in the form of a higher oxide. Dititanium trioxide ($Ti_2O_3$) may itself be reduced according to another equation:

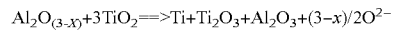

$$Al_2O_{(3-x)} + 3TiO_2 \Longrightarrow Ti + Ti_2O_3 + Al_2O_3 + (3-x)/2 O^{2-}$$

Regarding the ionic conduction, the atomic radius of tetravalent titanium is close to that of trivalent aluminum, and so the titanium may consequently form an anion of the type $TiAlO_3^+$ by substitution of one aluminum atom in the $Al_2O_3$ alumina.

Figure 4:
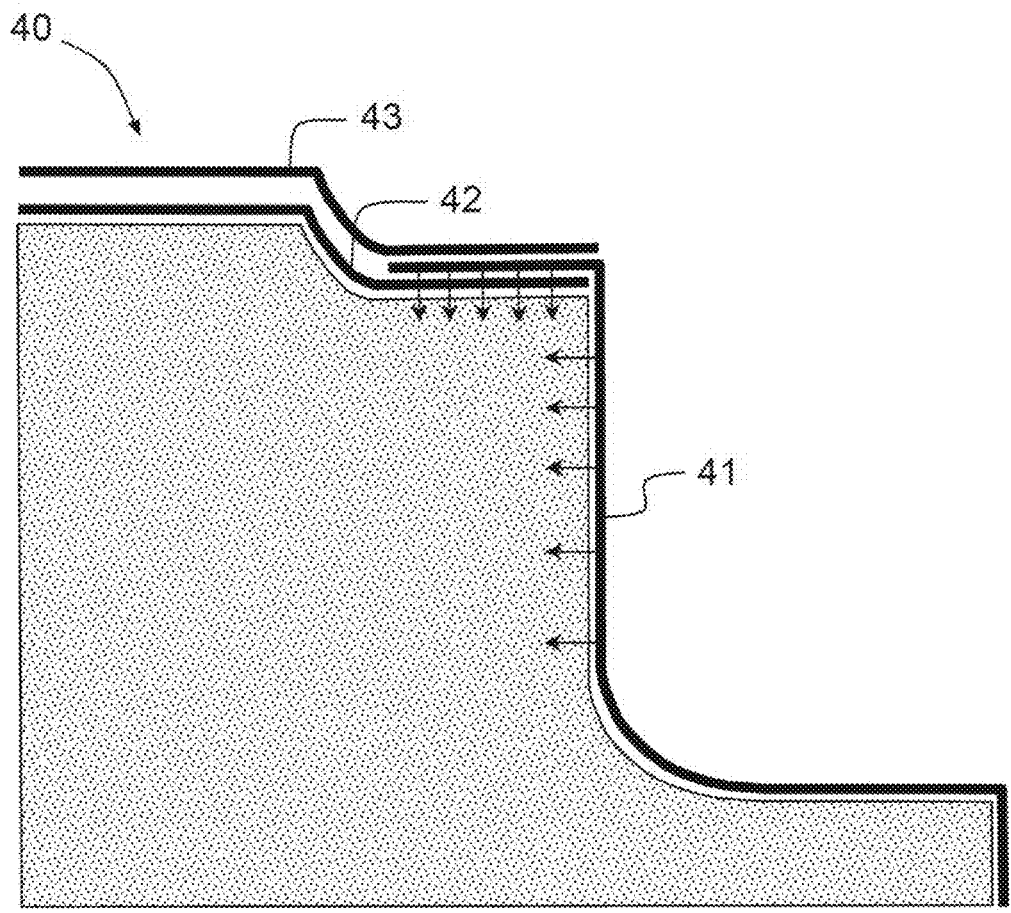
FIG. 4 shows a portion of the insulator at the interface with an electrode of the tube.

In the tube shown in FIG. 1, the charges that have collected in the zone 21 flow primarily toward the anode 12. The insulator 14 possesses a face 40 in electrical contact with the anode 12. The face 40 is metallized for the purpose of making this contact. To ensure perfect continuity in the flow of charges between the metallization and the deposit 41 diffused into the zone 21, the metallization and the deposit partially overlap. This partial overlap is illustrated in FIG. 4. More specifically, the electrical insulator 14 is partly covered by a first metallization 42. The deposit 41 partly covers this first metallization 42.

It is possible to add a second metallization 43 arranged over the first metallization 42, including over the portion of the first metallization 42 that is covered by the deposit 41.

This series arrangement of one metallization followed by a deposit and finally by another metallization allows the layers to form a sandwich, allowing the charges drained away by the zone 21 to be removed satisfactorily.

The invention claimed is:

1. An electrical insulator for insulating at least one electrode of a vacuum tube through which a charged particle beam flows, the electrical insulator being formed of an alumina-based ceramic, wherein the ceramic is formed of a polycrystalline material having boundaries, between the boundaries of which a vitreous phase of between 2% and 8% by weight is present and into which at least one metal oxide is diffused from a face of the electrical insulator, the metal oxide concentration decreasing gradually with distance from the face.

2. The electrical insulator as claimed in claim 1, wherein it exhibits a continuous variation in electrical resistance and a continuous variation in dielectric permittivity from the face down to a depth of the insulator to which the at least one metal oxide has not diffused.

3. The electrical insulator as claimed in claim 1, wherein the vitreous phase is between 5% and 7% by weight.

4. The electrical insulator as claimed in claim 1, wherein the vitreous phase comprises one or more alkaline-earth compounds mixed with fillers comprising at least one element from the group consisting of silica and zirconia.

5. The electrical insulator as claimed in claim 1, wherein the at least one metal oxide comprises a chromium oxide and a titanium oxide.

6. The electrical insulator as claimed in claim 1, wherein the electrical insulator is tubular in shape and in that the face from which the at least one metal oxide is diffused is an internal face of the tubular shape.

7. A process for producing an electrical insulator as claimed in claim 1, wherein it comprises a first step of depositing at least one metal oxide in solution in a solvent on the face of the insulator followed by a second step of heat treating the insulator, allowing the at least one metal oxide to diffuse into the vitreous phase of the ceramic.

8. The process for producing an electrical insulator as claimed in claim 6, wherein in the second step, periods under a reducing atmosphere are employed in series with periods under a more oxidizing atmosphere.

9. The process for producing an electrical insulator as claimed in claim 7, wherein before the second, heat treatment step, the alumina is substoichiometric with respect to oxygen.

10. A vacuum tube, wherein it comprises an electrical insulator as claimed in claim 1, and at least one electrode insulated by the electrical insulator.

11. The vacuum tube as claimed in claim 10, the electrical insulator of which is produced according to a process comprising a first step of depositing at least one metal oxide in solution in a solvent on the face of the insulator followed by a second step of heat treating the insulator, allowing the at least one metal oxide to diffuse into the vitreous phase of the ceramic, wherein the electrical insulator is partly covered by a first metallization making electrical contact with the at least one electrode, and in that the deposit partly covers the first metallization.

12. The vacuum tube as claimed in claim 11, wherein the electrical insulator is partly covered by a second metallization arranged over the first metallization, including over the portion of the first metallization that is covered by the deposit.

13. The vacuum tube as claimed in claim 10, wherein the tube is an X-ray generator.

14. The vacuum tube as claimed in claim 10, wherein the tube is a radiofrequency amplifier.

* * * * *